United States Patent
Lu et al.

(10) Patent No.: US 9,473,308 B2
(45) Date of Patent: Oct. 18, 2016

(54) METHOD AND SYSTEM FOR IMPLEMENTING DIGITAL SIGNATURE IN MOBILE OPERATING SYSTEM

(71) Applicant: Feitian Technologies Co., Ltd., Beijing (CN)

(72) Inventors: Zhou Lu, Beijing (CN); Huazhang Yu, Beijing (CN)

(73) Assignee: FEITAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 14/434,262

(22) PCT Filed: Dec. 2, 2013

(86) PCT No.: PCT/CN2013/088308
§ 371 (c)(1),
(2) Date: Apr. 8, 2015

(87) PCT Pub. No.: WO2014/101633
PCT Pub. Date: Jul. 3, 2014

(65) Prior Publication Data
US 2015/0295718 A1  Oct. 15, 2015

(30) Foreign Application Priority Data
Dec. 27, 2012 (CN) .......................... 2012 1 0578627

(51) Int. Cl.
| | |
|---|---|
| H04L 9/32 | (2006.01) |
| G06F 21/57 | (2013.01) |
| G06F 21/64 | (2013.01) |
| H04W 4/00 | (2009.01) |
| H04L 29/06 | (2006.01) |

(52) U.S. Cl.
CPC ............ *H04L 9/3247* (2013.01); *G06F 21/57* (2013.01); *G06F 21/645* (2013.01); *H04W 4/003* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 2005/0154898 A1* | 7/2005 | Chao ..................... | G06F 21/445 713/185 |
| 2006/0064593 A1* | 3/2006 | Dobranski ............ | H04L 9/3247 713/176 |
| 2008/0155509 A1* | 6/2008 | Ohta ..................... | G06F 21/572 717/127 |
| 2012/0079145 A1 | 3/2012 | Chang et al. | |
| 2013/0212525 A1* | 8/2013 | Shogaki .............. | G06F 3/04845 715/799 |

FOREIGN PATENT DOCUMENTS

| | | |
|---|---|---|
| CN | 101576843 A | 11/2009 |
| CN | 102662692 A | 9/2012 |
| CN | 102752104 A | 10/2012 |
| CN | 103067174 A | 4/2013 |

OTHER PUBLICATIONS

International Search Report dated Feb. 27, 2014 corresponding to PCT/CN2013/088308, 10 pp.
International Written Opinion dated Feb. 27, 2014 corresponding to PCT/CN2013/088308, 5 pp.

* cited by examiner

*Primary Examiner* — David Pearson
(74) *Attorney, Agent, or Firm* — Ohlandt, Greeley, Ruggiero & Perle, LLP

(57) ABSTRACT

A method and a system for implementing a digital signature in a mobile operating system. The method comprises: an application program coding to-be-signed data to obtain a first data packet; calling a preset system function by using an address character string of a service program, an address character string of an application program and the first data packet as parameters; when the service program is called by the preset system function, parsing function parameters, and storing the address character string of the service program; decoding the first data packet; if the decoding succeeds, sending the to-be-signed data and a preset signature type to an intelligent key device; otherwise, using decoding failure information as a returned value, and calling the preset system function by using the address character string of the application program and the returned value as parameters; receiving information returned by the intelligent key device; calling the preset system function by using the information returned by the intelligent key device, the address character string of the application program and the returned value as parameters; and the application program parsing the parameters of the preset system function to obtain a signature result and a returned value, and the operations end.

30 Claims, 5 Drawing Sheets

METHOD AND SYSTEM FOR IMPLEMENTING DIGITAL SIGNATURE IN MOBILE OPERATING SYSTEM

The present application claims the priority to Chinese Patent Application No. CN201210578627.6, filed with the Chinese Patent Office on Dec. 27, 2012, entitled as "METHOD AND SYSTEM FOR IMPLEMENTING DIGITAL SIGNATURE IN MOBILE OPERATING SYSTEM", the entire contents of which are is incorporated herein by reference in its entirety.

FIELD

The present disclosure relates to information security field, particularly to a method and system for implementing digital signature in a mobile operating system.

BACKGROUND

IPhone Operating System (iOS) device applies iOS as its operating system, which includes Apple products, such as iPhone, iPad, iPod Touch and Apple TV, etc. With rapidly and widely popularizing of iOS devices, the requirements and use of iOS device becomes more and more.

After softwares are distributed, generally the softwares are required to be modified and updated constantly. After being modified or added with a new function by a software developer, the application is released in the form of patches. A user updates those patches, i.e. modifying and updating is accomplished. Software modifying or updating is for satisfying requirements of users and avoiding virus attacking better.

SUMMARY

With purpose of overcoming deficiency of the conventional technology, the present disclosure provides a method and system for implementing digital signature in a mobile operating system, which implements independent arrangement of software.

The present disclosure provides a method for implementing digital signature in a mobile operating system, including:

in the case that an application is invoked, performing following steps:

step S1 including coding, by the application, data to be signed to obtain a first data package;

step S2 including invoking, by the application, a system preset function by taking an address character string of a service application, an address character string of the application and a first data package as parameters;

step S3 including analyzing, by the service application, parameters of the system preset function in the case that the service application is invoked by the system preset function, and storing the address character string of the application;

step S4 including decoding, by the service application, the first data package in the parameters of the system preset function obtained by analyzing, obtaining the data to be signed if the first data package is successfully decoded, and step S5 being executed; otherwise, invoking, by the service application, the system preset function by taking the stored address character string of the application and a returning value as parameter, and going to step S8, where the returning value is information that the decoding is failed;

step S5 including sending, by the service application, the data to be signed and a preset signing type to a smart key device;

step S6 including receiving, by the service application, information returned by the smart key device;

step S7 including invoking, by the service application, the system preset function by taking the information returned by the smart key device, the stored address character string of the application and a returning value as parameters; and step S8 including analyzing, by the application, parameters of the system preset function to obtain a signing result or the returning value, and ending in the case that the application is invoked by the system preset function.

Step S6 includes step S6' including receiving, by the service application, the information returned by the smart key device and determining whether the information returned by the smart key device is the signing result, going to step S7' if the information returned by the smart key device is the signing result; otherwise, invoking, by the service application, the system preset function by taking the stored address character string of the application and a returning value as parameters, where the returning value is information that the signing is an error;

step S7 includes step S7' including invoking the system preset function by taking the signing result, the stored address character string of the application and the returning value as parameters; and step S8 includes step S8' including analyzing, in the case that the application is invoked by the system preset function, by the application, the parameters of the system preset function and determining whether a returning value obtained by analyzing indicates correct information, obtaining the signing result if the returning value indicates the correct information and ending; otherwise, obtaining error information and ending.

Step S1 includes:

step S1-1 including: waiting, by the application, for receiving information input by a user and information of a first keystroke of a user, determining whether the information input by the user and the information of the first keystroke of the user are received; going to step S1-3 if the information input by the user and the information of the first keystroke of the user are received; otherwise going to step S1-2; where the information input by the user includes a first account, a second account, transmitting information, a certificate username and a sequence number of the smart key device;

step S1-2 including outputting, by the application, prompt information via a display, going back to step S1-1;

step S1-3 including encrypting, by the application, the certificate username in the information input by the user;

step S1-4 including determining, by the application, a type of a user keystroke according to the information of the first keystroke of the user, going to step S1-5 if the type of the user keystroke is an original signature; otherwise going to step S1-7;

step S1-5 including setting, by the application, a flag bit, combining first information, second information and third information to obtain the data to be signed and encrypting the data to be signed; where the first information is one part of the information input by the user, the second information is obtained by combining the other part of the information input by the user and preset information in the application and the third information is the preset information in the application;

step S1-6 including encoding, by the application, an encrypting result of data to be signed, generating the first data packet according to the encoding result and going to step S2;

step S1-7 including resetting, by the application, the flag bit and encrypting the first information, the second information and the third information respectively;

step S1-8 including encoding, by the application, an encrypting result of the first information, the second information and the third information respectively, generating the first data package according to the encoding result and going to step S2.

Generating the first data package according to the encoding result and the flag bit; where the encoding result includes the sequence number of the smart key device and an encrypted certificate username.

Step S2 includes:

step S2', taking, by the application, the address character string of the service application, the address character string of the application, a preset first verifying reference and the first data package as parameters, and invoking the system preset function.

After step S2, the method further includes:

step S2-1 including obtaining, by the application, a returning value of the system preset function and determining a type of the returning value, starting the service application if the returning value is YES; otherwise, ending.

Step S3 includes:

step S3-0 including in the case that the service application is invoked by the system preset function, analyzing parameters of the system preset function, authenticating an obtained first verifying reference and determining whether the authenticating is successful, storing the address character string of the application obtained by analyzing if the authenticating is successful; otherwise ending.

Step S3 further includes:

step S3-1 including in the case that the service application receives information of a second keystroke of a user input by the user, determining a type of a user keystroke according to the information of the second keystroke of the user, going to step S3-2 if the type of the user keystroke is an OK key; otherwise, information of user cancelation being taken as a returning value, invoking, by the service application, the system preset function by taking the address character string of the application and the returning value as parameters and going to step S8;

step S3-2 including outputting, by the service application, a modal dialogue box via the display;

step S3-3 including analyzing, by the service application, the parameters of the system preset function and storing the address character string of the application;

step S3-4 including obtaining, by the service application, the sequence number of the smart key device, determining whether the obtained sequence number of the smart key device is identical to the sequence number of the smart key device obtained by analyzing, going to step S4 if the obtained sequence number of the smart key device is identical to the sequence number of the smart key device obtained by analyzing; otherwise, information that verifying the sequence number of the smart key device is failed is taken as a returning value; invoking, by the service application, the system preset function by taking the stored address character string of the application and the returning value as parameters and going to step S8.

Step S4 includes:

step S4-1 including determining, by the service application, whether the flag bit is set, going to step S4-2 if the flag bit is set; otherwise, going to step S4-3;

step S4-2 including decoding, by the service application, the first data package, decrypting a decoding result, obtaining the certificate username input by the user and the data to be signed and going to step S4-4 if the decrypting is successful; otherwise, information that decrypting the decoding result is failed is taken as a returning value; invoking, by the service application, the system preset function by taking the stored address character string of the application and the returning value as parameters and going to step S8;

step S4-3 including decoding, by the service application, the first data package and decrypting a decoding result; obtaining the certificate username input by the user, the first information, the second information and the third information and combining the first information, the second information and the third information to obtain the data to be signed if decrypting the decoding result is successful, and going to step S4-4; otherwise, information that decrypting the decoding result is failed is taken as a returning value; invoking, by the service application, the system preset function by taking the stored address character string of the application and the returning value as parameters and going to step S8;

step S4-4 including verifying, by the service application, a PIN code input by the user, going to step S4-5 if the verifying is successful; otherwise, information that verifying PIN code is failed is taken as a returning value; invoking, by the service application, the system preset function by taking the stored address character string of the application and the returning value as parameters and going to step S8;

step S4-5 including obtaining, by the service application, a certificate public key and a certificate username from the certificate of the smart key device;

step S4-6 including verifying, by the service application, the obtained certificate username according to the certificate username input by the user, going to step S5 if the verifying is successful; otherwise, information that verifying certificate username is failed is taken as a returning value, invoking, by the service application, the system preset function by taking the stored address character string of the application and the returning value as parameters and going to step S8.

Before step S4-4, the method further includes receiving, by the service application, the PIN code input by the user.

Step S4-4 includes step S4-4' including obtaining, by the service application, a certificate public key and a certificate username from the certificate in the smart key device;

step S4-5 includes step S4-5' including verifying, by the service application, the certificate username input by the user by using the obtained certificate username, going to step S4-6' if the verifying is successful; otherwise, information that verifying the certificate username is failed is taken as a returning value, invoking, by the service application, the system preset function by taking the address character string and the returning value as parameters and going to step S8;

step S4-6 includes step S4-6' including verifying, by the service application, the PIN code input by the user, going to step S5 if the verifying is successful; otherwise, information that verifying PIN code is failed is taken as a returning value, invoking, by the service application, the system preset function by taking the stored address character string of the application and the returning value as parameters and going to step S8.

Before step S5, the method further includes connecting, by the service application, to the smart key device.

Step S7 includes:

step S7-1 including invoking, by the service application, the system preset function by taking a preset second verifying reference, the stored address character string of the application, the information returned by the smart key device and the returning value as parameters; and clearing the modal dialogue box and ending.

Step S6' includes step S6'-1 including receiving, by the service application, the information returned by the smart key device, determining whether the information returned by the smart key device is the signing result, going step S7' if the information returned by the smart key device is the signing result; otherwise, information of a error signature is taken as a returning value, invoking, by the service application, the system preset function by taking a preset second authenticating parameter, the stored address character string of the application and the returning value as parameters;

step S7' includes step S7'-1 including invoking, by the service application, the system preset function by taking the preset second verifying reference, the stored address character string of the application, the information returned by the smart key device and the returning value as parameters.

step S8 includes:

step S8-0 including in the case that the application is invoked by the system preset function, analyzing the references of the system preset function, authenticating the second verifying reference obtained by analyzing, determining whether the authenticating is successful, obtaining the signing result or a returning value if the authenticating is successful and ending; otherwise, ending.

Step S8' includes:

step S8'-0 including in the case that the application is invoked by the system preset function, analyzing the parameters of the system preset function, authenticating whether the second verifying reference obtained by analyzing is successful, determining whether a returning value obtained by analyzing is a returning value indicating correct information if the authenticating is successful; obtaining the signing result if the returning value obtained by analyzing is the returning value indicating the correct information, and ending; otherwise, obtaining error information, and ending; in the case that the authenticating is failed, ending.

Step S8' further includes: displaying the signing result or displaying corresponding information according to the returning value.

The present disclosure provides a system for implementing digital signature in a mobile operating system, including: an application device and a service device; wherein the application device includes a encoding module, a first invoking module and a first responding module;

the encoding module is configured to encode data to be signed to obtain a first data package;

the first invoking module is configured to invoke a system preset function by taking an address character string of service application, an address character string of application and the first data package as parameters;

the first responding module is configured to analyze parameters of the system preset function in the case that the application is invoked by the system preset function;

the service device includes: an analyzing module, a storing module, a decoding module, a sending module, a second receiving module and a second invoking module;

the analyzing module is configured to analyze the parameters of the system preset function in the case that the service application is invoked by the system preset function;

the storing module is configured to store the address character string of the application;

the decoding module is configured to decode the first data package in the parameter of the system preset function obtained by analyzing;

the sending module is configured to send the data to be signed obtained by successful decoding of the decoding module and a preset signing type to a smart key device;

the second receiving module is configured to receive information returned by the smart key device;

the second invoking module is configured to invoke the system preset function by taking the information returned by the smart key device, a stored address character string of the application and a returning value as parameters, or invoke the system preset function by taking the stored address character string of the application and the returning value as parameters.

The second receiving module in the service application includes a receiving unit and a first determining unit;

the receiving unit is configured to receive the information returned by the smart key device;

the first determining unit configured to determine whether the information returned by the smart key device is a signing result;

the application device further includes a first determining module;

the first determining module is configured to determine whether the returning value is a returning value indicating correct information.

The application device further includes a first receiving module and a combining module;

the first receiving module includes a first receiving unit, a second determining unit, a first displaying unit, a first encrypting unit and a third determining unit;

the first receiving unit is configured to receive information input by the user and information of a first keystroke of a user;

the second determining unit is configured to determine whether the information input by the user and the information of the first keystroke of the user are received;

the first displaying unit is configured to output prompt information via a display;

the first encrypting unit is configured to encrypt a certificate username in the information input by the user;

the third determining unit is configured to determine a type of a user keystroke according to the information of the first keystroke of the user;

the combining module includes a flag bit unit, a first combining unit and a second encrypting unit;

the flag bit unit is configured to set a flag bit or reset the flag bit;

the first combining unit is configured to combine first information, second information and third information to obtain the data to be signed;

the second encrypting unit is configured to encrypt the data to be signed, or encrypt the first information, the second information and the third information respectively.

The first invoking module is further configured to invoke the system preset function by taking the address character string of the service application, the address character string of the application, a preset first verifying reference and the first data package as parameters.

The first invoking module includes a first invoking unit, a first obtaining unit and a fourth determining unit;

the first invoking unit is configured to invoke the system preset function by taking the address character string of the service application, the address character string of the application and the first data package as parameters;

the first obtaining unit is configured to obtain a returning value of the system preset function;

the fourth determining unit is configured to determine a type of the returning value of the system preset function.

The service application includes a second responding module configured to respond the system preset function;

the second responding module includes a second authenticating unit and a fifth determining unit;

the second authenticating unit is configured to authenticate a first verifying reference obtained by analyzing;

the fifth determining unit is configured to determine whether the first verifying reference is successfully authenticated.

The service application further includes a verifying module configured to verify a sequence number of the smart key device obtained by the analyzing module;

the verifying module includes a second receiving unit, a sixth determining unit, a second displaying unit, a second obtaining unit and a seventh determining unit;

the second receiving unit is configured to receive information of a second keystroke of a user;

the sixth determining unit is configured to determine a type of a user keystroke according to the information of the second keystroke of the user;

the second displaying unit is configured to output a modal dialogue box via the display;

the second obtaining unit is configured to obtain the sequence number of the smart key device; and the seventh determining unit is configured to determine whether an sequence number of the smart key device obtained by the seventh determining unit is identical to a sequence number of the smart key device obtained by analyzing.

The decoding module includes an eighth determining unit, a decoding unit, a decrypting unit, a second combining unit, a first verifying unit, a third obtaining unit and a second verifying unit;

the eight determining unit is configured to determine whether the flag bit obtained by analyzing is set;

the decoding unit is configured to decode the first data package obtained by analyzing;

the decrypting unit is configured to decrypt a result of successful decoding performed by the decoding unit;

the second combining unit is configured to combine the first information, the second information and the third information to obtain data to be signed when the decrypting unit performs a successful decryption;

the first verifying unit is configured to verify a PIN code input by the user;

the third obtaining unit is configured to obtain a certificate public key and a certificate username from the certificate of the smart key device;

the second verifying unit is configured to verify the certificate username input by the user according to the certificate username obtained by the third obtaining unit.

The second receiving unit is further configured to receive the PIN code input by the user.

The application device further includes a connecting module configured to connect to the smart key device.

The second invoking module further configured to invoke the system preset function by take a preset second verifying reference, the stored address character string of the application, the information returned by the smart key device and the returning value as parameters and clear the modal dialogue box.

The first responding module includes an analyzing unit, a first authenticating unit and a ninth determining unit;

the analyzing unit is configured to analyze the references of the system preset function in the case that the application is invoked by the system preset function;

the first authenticating unit is configured to authenticate the second verifying reference obtained by analyzing; and the ninth determining unit is configured to determine whether the second verifying reference is successfully authenticated.

The application device further includes a displaying module configured to display the signing result or error information according to the returning value.

Comparing with the conventional art, the present disclosure includes following advantages that the service side provides service interfaces to the client side; after the application is programmed by the user according to interface specifications, the service application is modified or updated at the service side and the client application need not to be changed; correspondingly, the client application is modified or updated and the service side need not to be changed; system update is simple and convenient, which may effectively prevent virus attacks.

DETAILED DESCRIPTION

At present, in iOS4 and higher versions of the iOS, Multi-task mechanism are not conventional multiple tasks, i.e. any application can be freely executed at backend. Backend interface which is opened by an Apple device to a third party developer just includes functions such as an audio broadcasting (for example, a network radio application), a geographical position detecting (for example, a GPS application) and a network telephone (for example, network instant voice communication tool Skype), etc. In iOS4 and higher versions, if the user clicks Home key for going back to desktop, the executed application is not exit but frozen. Though the application is in backend and is in frozen status, the application is still run and the system resource previously allocated to the application is still occupied. Therefore, when a user returns to the application, the application can restore to the status when it exits last time, that is the core of the multiple tasks of iOS4 and higher versions of the iOS. Some operations such as audio broadcasting may be performed to by the application in the frozen status, however, not all operations. In addition, iOS4 system can terminate an application in order to save memory.

From what is described above, in order to meet the requirement of interactively invoking between an application and a service application, the present disclosure employs a jump of openURL function to solve the problem.

The technical solutions of the embodiments of the disclosure are described clearly and completely in conjunction with drawings as follows. Apparently, the described embodiments are merely a few of but not all of the embodiments according to the disclosure. Based on the described embodiments of the disclosure, other embodiments obtained by those of ordinary skill in the art without any creative work belong to the scope of the disclosure.

Embodiment 1

Figure 1:
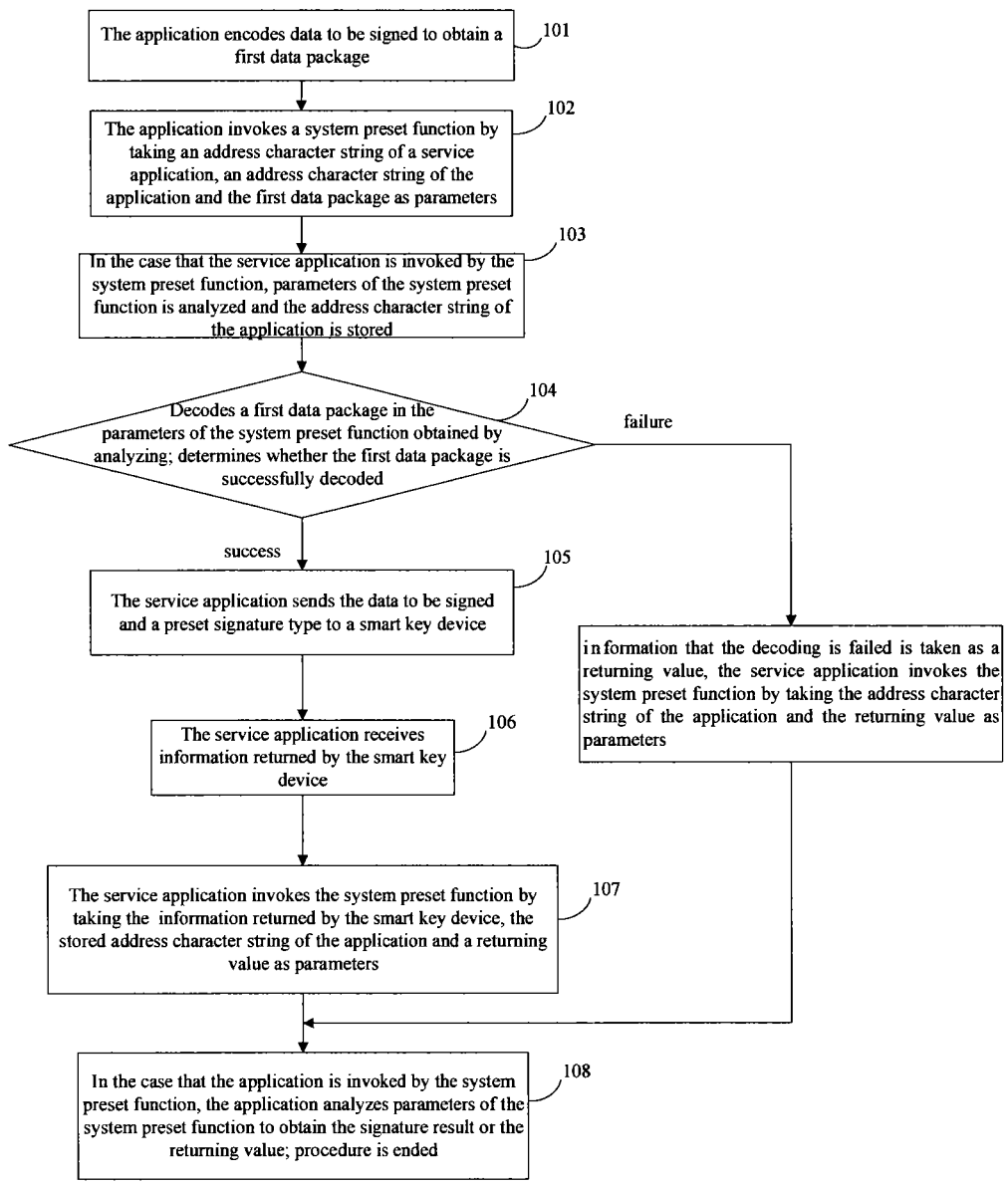
FIG. 1 shows a flowing diagram for a method for implementing digital signature in a mobile operating system provided in Embodiment 1 of the present disclosure.

Embodiment 1 of the present disclosure provides a method for completing a digital signing in a mobile system. As shown in FIG. 1, when an application is invoked, the present disclosure includes step 101 to step 108.

In step 101, the application encodes data to be signed to obtain a first data package.

In step 102, the application invokes a system preset function by taking an address character string of a service application, an address character string of the application and the first data package as parameters.

In step 103, in the case that the service application is invoked by the system preset function, parameters of the system preset function is analyzed and the address character string of the application is stored.

In step 104, the service application decodes a first data package in the parameters of the system preset function obtained by analyzing; obtains the data to be signed and executes step 105 if the first data package is successfully decoded; otherwise, information that the decoding is failed is taken as a returning value, the service application invokes the system preset function by taking the address character string of the application and the returning value as parameters and step 108 is executed.

In step 105, the service application sends the data to be signed and a preset signature type to a smart key device.

In the present embodiment, before step 105, the method further includes that the service application communicates with the smart key device. After the smart key device receives the data to be signed and the preset signature type, the smart key device signs the data to be signed according to an algorithm corresponding to the preset signature type and returns a sign result to the service program. The smart key device returns information that the sign is an error if there is no algorithm corresponding to the preset signature type in the smart key device.

In step 106, the service application receives information returned by the smart key device.

In Embodiment 1, the information returned by the smart key device includes a signing result or information that the signing is an error.

In step 107, the service application invokes the system preset function by taking the information returned by the smart key device, the stored address character string of the application and a returning value as references.

In step 108, in the case that the application is invoked by the system preset function, the application analyzes parameters of the system preset function to obtain the signature result or the returning value; the procedure is ended.

The present embodiment provides a method for completing digital signing in a mobile system provided in Embodiment 1. In the case that the application is modified or updated, the service application does not need to be changed; on the contrary, in the case that the service application is modified or updated, the application does not need to be changed, which realizes that the application and the service application are arranged independently, which can avoid attack of virus.

Embodiment 2

Figure 2:
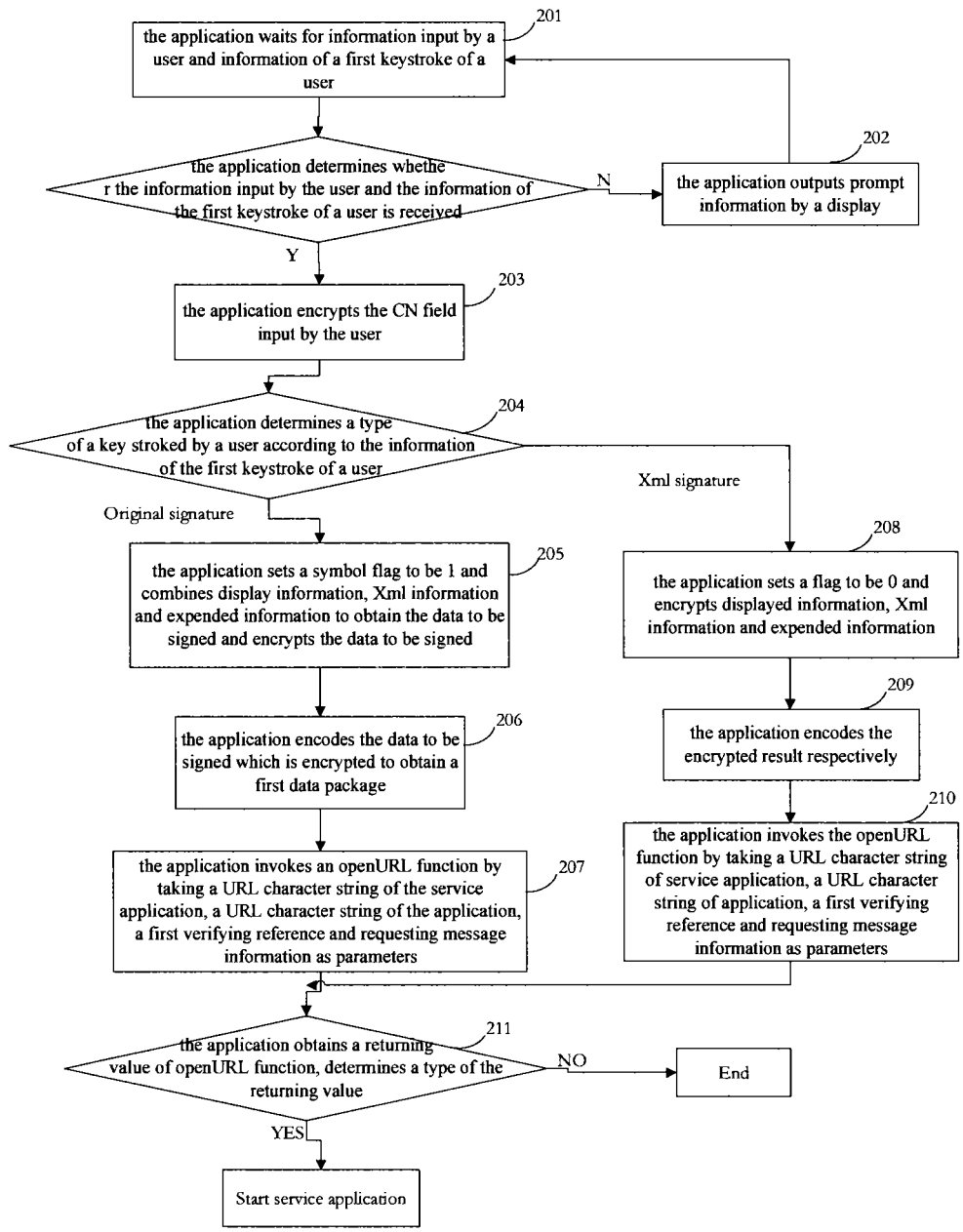
FIG. 2, FIG. 3 and FIG. 4 illustrate a flowing diagram for a method for implementing digital signature in a mobile operating system provided in Embodiment 2 of the present disclosure.
Figure 3:
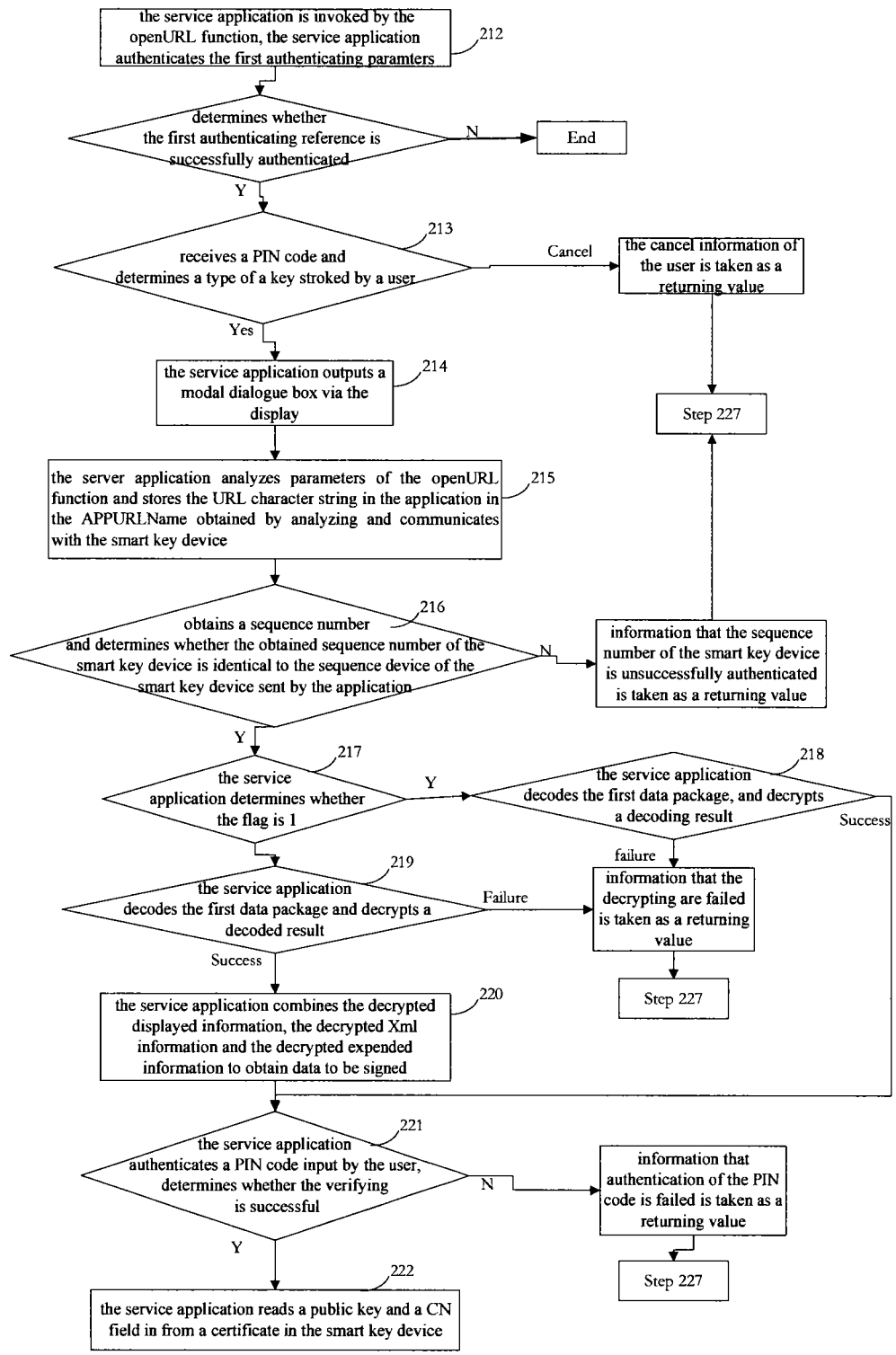
Figure 4:
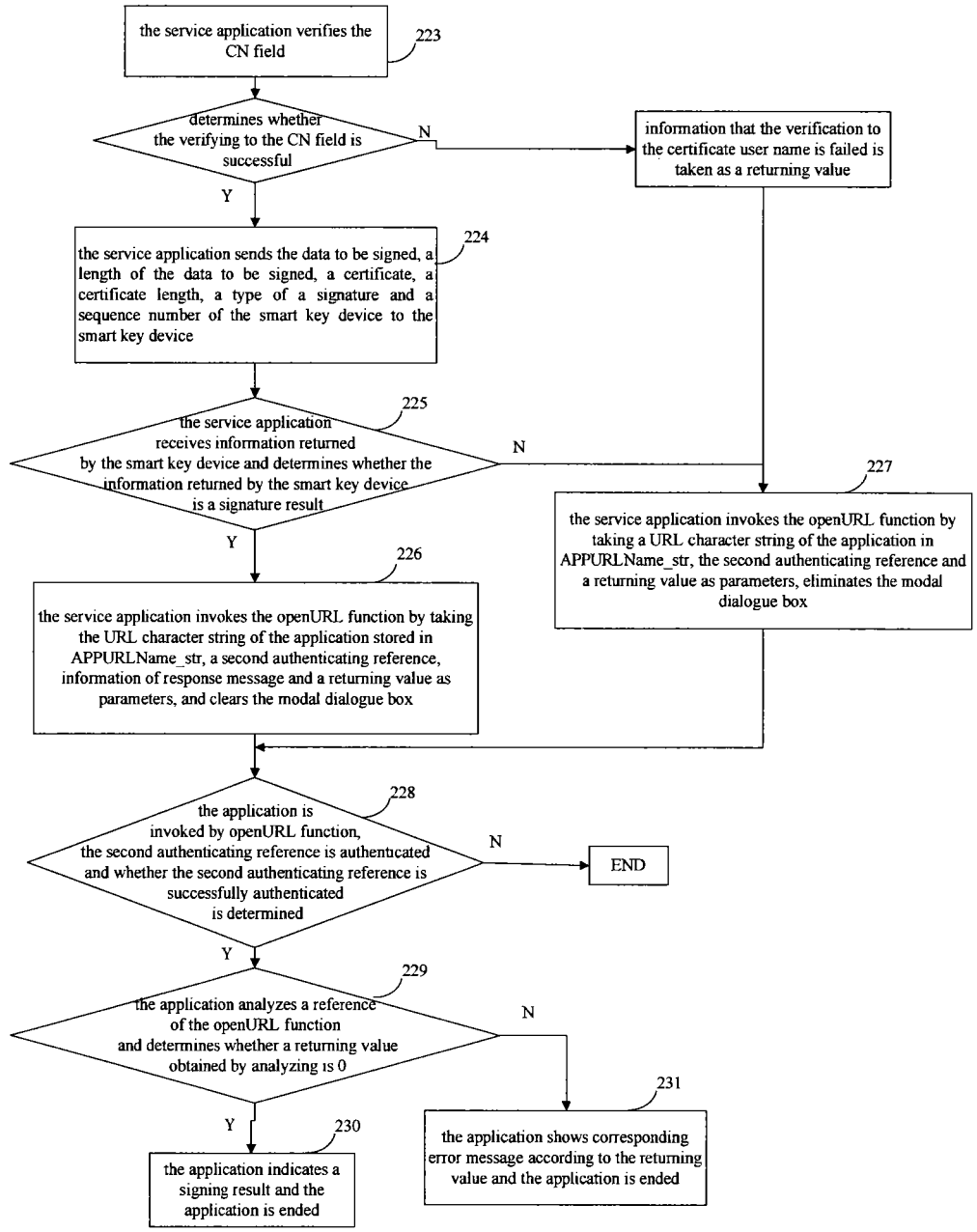

A method for completing digital signing in a mobile operating system provided in Embodiment 2 of the present disclosure. As shown in FIG. 2, FIG. 3 and FIG. 4, URL option in a configuration file of an application and the same of a service application are preset. In the case that the application is invoked, the method includes step 201 to step 231.

In step 201, the application waits for information input by a user and information of a first keystroke of a user. The application determines whether the information input by the user and the information of the first keystroke of a user is received, step 203 is executed if the information input by the user and the information of the first keystroke of a user is received; otherwise, step 202 is executed.

In Embodiment 1, the user determines whether invokes the application according to a preset list; in addition, the user may determine whether invokes the application according to the configuration file.

For example, in Embodiment 1, the information input by the user includes a first account number, a second account number, transmitting information, a CN (Cert Name) field and a sequence number of a smart key device.

For example, the first account number in Embodiment 1 may be 123456789; the second account number may be 987654321, the transmitting information may be 12, the CN field may be test, the sequence number of the smart key may be FFFFFFFFFF.

In step 202, the application outputs prompt information by a display; returns to step 201.

For example, in Embodiment 2, the prompt information is that the user is required to input the first account number, the second account number, the transmitting information, the CN field and the sequence number of the smart key device.

In step 203, the application encrypts the CN field input by the user.

For example, in the present embodiment, a symmetric cipher algorithm is used for encrypting CN field. Optionally, a symmetric cipher algorithm of the Triple Data Encryption Algorithm (3DES) in CBC module is applied. 2 keys are used with filling of PKCS#5. A key is generated by a plurality of factors, which includes a build-in key, a session identifier and a random factor. Those factors above are assembled in turn and then digest is performed with SHA1; the first 16 bits are taken as a key; where the build-in key is prestored in the smart key device.

In step 204, the application determines a type of a key stroked by a user according to the information of the first keystroke of a user, step 205 is executed if the key stroked by the user is an original signature; step 209 is executed if the key stroked by the user is an Xml signature.

In step 205, the application sets a symbol flag to be 1 and combines display information, Xml information and expended information to obtain the data to be signed and encrypts the data to be signed.

In the present embodiment, the display information is input by the user, the Xml information is obtained by combining information prestored in the application and the information input by the user, the extended information is preset in the application.

In the present embodiment, the encrypting method of step 205 is the same as that of step 203. Optionally, in the present embodiment, the application performs TLV (tag, length, value) combination on the display information, the Xml information and the extended information.

For example, in the present embodiment, a combined message may be:

```
11000000009662100000000848<?xml version="1.0" encoding="UTF-8"?><TradeData><field
name="\u91d1\u989d" value="1\u5143" DisplayOnScreen="TRUE"/><field
name="\u5927\u5199\u91d1\u989d" value="\u58f9\u4f70\u8d30\u62fe\u53c1\u5143\u6574"
DisplayOnScreen="TRUE"/><field name="\u6c47\u6b3e\u5355\u4f4d\u540d\u79f0"
value="\u5317\u4eac\u634c\u96f6\u540e\u5e7f\u544a\u5236\u4f5c\u6709\u9650\u516c\u53f8"
DisplayOnScreen="TRUE"/><field name="\u6c47\u6b3e\u5355\u4f4d\u8d26\u53f7"
value="1222" DisplayOnScreen="TRUE"/><field
name="\u6c47\u6b3e\u5355\u4f4d\u5f00\u6237\u884c\u540d\u79f0"
value="\u548c\u5e73\u8857\u652f\u884c" DisplayOnScreen="TRUE"/><field
name="\u6536\u6b3e\u5355\u4f4d\u540d\u79f0"
value="\u591a\u6765\u63d0\u00b7\u7a46\u6d77\u9ea6\u63d0"
DisplayOnScreen="TRUE"/><field name="\u6536\u6b3e\u5355\u4f4d\u8d26\u53f7"
value="1222" DisplayOnScreen="TRUE"/><field
name="\u6536\u6b3e\u5355\u4f4d\u5f00\u6237\u884c\u540d\u79f0" value="xxxx"
DisplayOnScreen="TRUE"/><field name="\u767b\u9646ID" value="80hou0.c.0200"
DisplayOnScreen="TRUE"/><field name="\u4ea4\u6613\u63d0\u4ea4\u65f6\u95f4"
value="2012061416"
DisplayOnScreen="TRUE"/></TradeData>220000000082\u91d1\u989d:1\u5143
    \u6c47\u6b3e\u8d26\u53f7:1222(\u5de5\u5546\u94f6\u884c)
    \u6536\u6b3e\u8d26\u53f7:1222(\u5de5\u5546\u94f6\u884c)230000000000.
```

In step 206, the application encodes the data to be signed which is encrypted to obtain a first data package.

Optionally, the present embodiment, the application performs Base64 encoding on the encrypted combined message.

In step 207, the application invokes an openURL function by taking a URL character string of the service application, a URL character string of the application, a first verifying reference and requesting message information as parameters, and executes step 211.

In the present embodiment, an openURL function is a system function of the iOS system.

In the present embodiment, the first verifying reference is for authenticating the application in the service application.

In the present embodiment, the first verifying reference and the URL character string of the service application are prestored in the application.

In the present embodiment, the requesting message information includes a flag, a URL character string of the application, a sequence number of a smart key device input by the user, a CN field input by the user and a first data package. Specifically, the flag is MessageType in the requesting message information, the URL character string of the application is APPURLName in the requesting message information, the sequence number of a smart key device input by the user is U_Serial Number in the requesting message information, the CN field input by the user is client certificate identifier in the requesting message information, the first data package is Sign_Plain Text in the requesting message information.

Beside, in the present embodiment, the requesting message information further includes Version, Session ID, Random, APPVersion, U_SerialNumber, U_language, U_Charest, Sign_WarningInfo and Reserve. The requesting message information above is prestored in the application.

For example, in Embodiment 2, the way for invoking the openURL function is:
openURL: url
the parameters of openURL function may be:

```
url=cn.com.xxxx.ftsafe.pad://MessageType=0&Version=1.0.0.0&SessionID=1111111111111
1111111111111111111111111111&Random=2222222222222222222222222222222222222222&A
PPURLName=cn.com.xxxx.pad&APPVersion=1.0.0.0&U_SerialNumber=FFFFFFFFFF&U_Cer
tCN=//RWwp6uvnQ=&U_Language=zh_CN&U_Charset=UTF-8&Sign_WarningInfo=Warning
&Sign_PlainText=A0IZ2oEy5YjkAk_aHWmnvS4lJ94c0iikwppHANJ9rj2dPui8Fcpoir3d4UbK9
xL_s1azL4n5pOwGGkKJtcLrw9qPHeYOd5Ai6PvMniIbKakpUT9whmWftUFXvnOXWrSYtsql
AAjnbUjafgGVgmDxLspLz9ZdeTDxOjrJvDJUzMYGkhrDah6bGhe2acKjXUOXte0W2vBApb
ScP5avN_QHL3Cqfmqrlo1LDCdtx7mPgRR3twaT0JhI0iNCWru4b6Lg361scWCuWnX-AXvJy
XuBso8OuGmUVLqKDX2aBscG98b62ao4PCZNC01VlSfZmZKvtCNpJYlZ-Br1TVQZoSpTfq
50je-_2S-tdWI4a3MPN7Fwr55pc1hsF_bGtUfupXo-pENE2XafQ8ANO0vaIHz6p4iydX_4-_EV2
9aiBwwdSTLZlr2FTvnTdNYjJOBg3a9rlZy9gni78c0S0f7kwG62cUU4xvgz1WcFMwvxhPut7Q
VOphng4Xi3XDzYp6pqvAamv_9mVKO-27GpLjQ2QHpST0CUzhJDZH15RV8l1BDDuT78I7
VBcuGa3bAL7eBXCUA81K7UWpzC-dBVCcD0LmnEaCFOMuLF3EGyak5LSoeGb3Xu4toIV
jS_XgbtEKMFaEZo_1ktehAKqPqlvJE3QnDskLo1YQPK3LuDe2AR0YJmB0x6swsKvXPpNIn
FEQBCsm2cSb3PZGjLzyUBwKDYCfzK4tbZ60PvbYYzJUNYmQgptqPum7inq1i6j000bjrsMF
bG-jiXGIRd0-xEZeN6gpuVKWtVI0a5-Jd3TGF9B5tBqjgT4bOoVy9B4R20Vr6HKHMun6_jid3
dr9Y1xDG314-B9f8KfPKq_ftA4MG2C6ROiXtAhDLNqm17QIRP7MeWBSho7HfiH3FHTIhuX
pkJ_v_JZi0rIt83kB5-nnwjSK0sCDCfsvX3zW0090NinNLIct2cnfK3xz6HAdU5Vedl_2T8nID8JA
VbyzbFPYPXOb3mcJPpwkFgXTcTawupSVM8___mt_Oa-0GqXFogHTRJRQ4wgnzX6QTK92
dsseXNgtAc80iWGLmPP0ERyj99oF8JcIA135tpdLlqB_WxrtkPgCyT5w80jiTv8sPnPkkxlcM7da
Mw64rFjauv79CnIIrtS88mdd_1iWMo8xMuZc258GTbrs8aRlocYa1LnwVwx3t97qSy-_O4DH9J
cJsywhmy43hmAY17epdZD5U9_z5eBhFccnKg7IYiZVIe9o7rQN8CD_dRwgnduuh_i6D5n4Sm
zDAGfamLKgGZA-M9kjWSt8D9hNcIRUljQF9JxRUu6QK0a1qiI_YFo28rrfos1JUTTrS5H3VX
gqqRcIZDA23M0DJZK4S8xW_-Vp7w&Sign_XMLInfo=&Sign_KeyInfo=&Sign_FileInfo=&R
eserve=.
```

In step 208, the application sets a flag to be 0 and encrypts displayed information, Xml information and expended information.

In the present embodiment, the encrypting method in step 208 is the same as that in step 203.

For example, in the present embodiment, the displayed information may be:

\u91d1\u989d:12\u5143
    \u6c47\u6b3e\u8d26\u53f7:123456789(\u5de5\u5546\u94f6\u884c)
    \u6536\u6b3e\u8d26\u53f7:987654321(\u5de5\u5546\u94f6\u884c).
The encrypted displayed information is: poNPdZy7rcYeSYECejXLR5E+Xd21Q8Ofp
    MUupuSiJgBtRySw3HcydrCL/XPHYmH1ugdhJO5IFLU1mcFg4XxYCu4L7s81/UBf08EK
PA/figdoODV8Nnf/+fFcNJ62SEs/.

In step 209, the application encodes the encrypted result respectively.

Optionally, in the present embodiment, the application performs Base64 encoding on the encrypted result.

In the present step, the encrypted result includes encrypted a CN field, encrypted display information, encrypted Xml information and encrypted expended information.

For example, in the present embodiment, the encrypted display information is encoded, and the result is:

poNPdZy7rcYeSYECejXLR5E-Xd21Q8OfpMUupuSiJgBtRySw3HcydrCL_XPHYmH1ugd
hJO5IFLU1mcFg4XxYCu4L7s81_UBf08EKPA_figdoODV8Nnf_-fFcNJ62SEs.

In step 210, the application invokes the openURL function by taking a URL character string of service application, a URL character string of application, the first verifying reference and requesting message information as parameters.

In the present embodiment, the openURL function is a system function of iOS system.

In the present embodiment, the first verifying reference is for authenticating the application in the service application;

The first verifying reference and the URL character string of service application are preset in application.

In the present embodiment, the flag is MessageType in the requesting message information, the URL character string of application is APPURLName in the requesting message information, the sequence number of the smart key device input by the user is U_SerialNumber in the requesting message information, the encrypted and encoded displayed information is Sign_KeyInfo in the requesting message information, the encrypted and encoded Xml information is Sign_XMLInfo in the requesting information, the encrypted and encoded expended information is Sign_FileInfo in the requesting message information.

Besides, the present embodiment, the requesting message information further includes Version, session ID, Random, APPVersion, U_SerialNumber, U_CertCN, U_Language, U_Charset, Sign_WarningInfo and Reserve. The above requesting message information is preset in the application.

In step 211, the application obtains a returning value of openURL function, determines a type of the returning value, the application starts the service application if the type of the returning value is YES; the application ends the operation if the type of the returning value is NO.

In the present embodiment, the returning value of openURL function is a BOOL type.

In the present step, the openURL function searches for registered app in an option of URL Schemes according to the URL character string of the service application, the openURL function returns YES if the registered app is found; the openURL function returns NO if the registered app is not found.

For example, in the present embodiment, the URL of service application may be cn.com.xxxx.ftsafe.phone.

In step 212, in the case that the service application is invoked by the openURL function, the service application authenticates the first verifying reference and determines whether the first verifying reference is successfully authenticated, step 213 is executed if the first verifying reference is successfully authenticated; otherwise, operation is ended.

The service application determines whether the first verifying reference is identical to an verifying reference preset in the service application, step 213 is executed if the first verifying reference is identical to a verifying reference preset in the service application; otherwise, operation is ended.

In step 213, in the case that the service application receives a PIN code input by the user and information of a second keystroke of a user, the service application determines a type of a key stroked by a user according to the information of the second keystroke of a user, step 214 is executed if the type is YES; the cancel information of the user is taken as a returning value and step 227 is executed if the type is NO.

In step 214, the service application outputs a modal dialogue box via the display.

For example, in the present embodiment, the content of the modal dialogue box may be: It is signing now, please wait.

In step 215, the server application analyzes parameters of the openURL function and stores the URL character string of the application in the APPURLName obtained by analyzing in APPURLNamestr, and communicates with the smart key device.

For example, in the present embodiment, the parameters of openURL function may be:

cn.com.xxxx.ftsafe.pad://MessageType=0&Version=1.0.0.0&SessionID=11111111111111111
1111111111111111111111&Random=2222222222222222222222222222222222222222&APPU
RLName=cn.com.xxxx.pad&APPVersion=1.0.0.0&U_SerialNumber=FFFFFFFFFF&U_CertCN
=//RWwp6uvnQ=&U_Language=zh_CN&U_Charset=UTF-8&Sign_WarningInfo=Warning&Sig -continued

```
n__PlainText=A0IZ2oEy5YjkAk__aHWmnvS4lJ94c0iikwppHANJ9rj2dPui8Fcpoir3d4UbK9xL__s
1azL4n5pOwGGkKJtcLrw9qPHeYOd5Ai6PvMniIbKakpUT9whmWftUFXvnOXWrSYtsqlAAj
nbUjafgGVgmDxLspLz9ZdeTDxOjrJvDJUzMYGkhrDah6bGhe2acKjXUOXte0W2vBApbScP5
avN__QHL3Cqfmqrlo1LDCdtx7mPgRR3twaT0JhI0iNCWru4b6Lg361scWCuWnX-AXvJyXuBs
o8OuGmUVLqKDX2aBscG98b62ao4PCZNC01VlSfZmZKvtCNpJYlZ-Br1TVQZoSpTfq50je-__
2S-tdWI4a3MPN7Fwr55pc1hsF__bGtUfupXo-pENE2XafQ8ANO0vaIHz6p4iydX__4-__EV29aiB
wwdSTLZlr2FTvnTdNYjOBg3a9rlZy9gni78c0S0f7kwG62cUU4xvgz1WcFMwvxhPutVQVOp
hng4Xi3XDzYp6pqvAamv__9mVKO-27GpLjQ2QHpST0CUzhJDZH15RV8l1BDDuT78I7VBcu
Ga3bAL7eBXCUA81K7UWpzC-dBVCcD0LmnEaCFOMuLF3EGyak5LSoeGb3Xu4toIVjS__Xg
btEKMFaEZo__1ktehAKqPqlvJE3QnDskLo1YQPK3LuDe2AR0YJmB0x6swsKvXPpNInFEQB
Csm2cSb3PZGjLzyUBwKDYCfzK4tbZ60PvbYYzJUNYmQgptqPum7inq1i6j000bjrsMFbG-jiX
GIRd0-xEZeN6gpuVKWtVI0a5-Jd3TGF9B5tBqjgT4bOoVy9B4R20Vr6HKHMun6__jid3dr9Y1x
DG314-B9f8KfPKq__ftA4MG2C6ROiXtAhDLNqm17QIRP7MeWBSho7HfiH3FHTIhuXpkJ__v__
JZi0rIt83kB5-nnwjSK0sCDCfsvX3zW0090NinNLIct2cnfK3xz6HAdU5Vedl__2T8nID8JAVbyzb
FPYPXOb3mcJPpwkFgXTcTawupSVM8___mt__Oa-0GqXFogHTRJRQ4wgnzX6QTK92dsseX
NgtAc80iWGLmPP0ERyj99oF8JcIAl35tpdLlqB__WxrtkPgCyT5w80jiTv8sPnPkkxlcM7daMw64
rFjauv79CnIIrtS88mdd__1iWMo8xMuZc258GTbrs8aRlocYa1LnwVwx3t97qSy-__O4DH9JcJsyw
hmy43hmAY17epdZD5U9__z5eBhFccnKg7IYiZVIe9o7rQN8CD__dRwgnduuh__i6D5n4SmzDAG
famLKgGZA-M9kjWSt8D9hNcIRUljQF9JxRUu6QK0a1qiI__YFo28n-fos1JUTTrS5H3VXgqqRc
IZDA23M0DJZK4S8xW__-Vp7w&Sign__XMLInfo=&Sign__KeyInfo=&Sign__FileInfo=&Reserve
=.
```

In step 216, the server application obtains a sequence number from the smart key device and determines whether the obtained sequence number of the smart key device is identical to the sequence device of the smart key device sent by the application, step 217 is executed if the obtained sequence number of the smart key device is identical to the sequence device of the smart key device sent by the application; otherwise, information that the sequence number of the smart key device is unsuccessfully authenticated is taken as a returning value and step 227 is executed.

In step 217, the service application determines whether the flag is 1, step 218 is executed if the flag is 1; otherwise, step 219 is executed if the flag is not 1.

In step 218, the service application decodes the first data package, and decrypts a decoding result, the data to be signed is obtained and step 221 is executed if the decrypting is successful; otherwise, information that the decoding and decrypting are failed is taken as a returning value and step 227 is executed.

In step 219, the service application decodes the first data package and decrypts a decoded result, the CN character string, the displayed information, the Xml information and the expended information are obtained if the decoding is successful, and step 220 is executed; otherwise, information that decoding and information that the decrypting are failed is taken as a returning value, and step 227 is executed.

For example, in the present embodiment, the encoded data may be:

```
poNPdZy7rcYeSYECejXLR5E-Xd2lQ8
OfpMUupuSiJgBtRySw3HcydrCL__XPHYmH1ugdhJO5IFLU1mcFg4XxYCu4L7s81__
UBf08EKPA__figdoODV8Nnf__-fFcNJ62SEs.
```

The data obtained by decrypting and decoding is:

```
\u91d1\u989d:12\u5143
\u6c47\u6b3e\u8d26\u53f7:123456789(\u5de5\u5546\u94f6\u884c)
\u6536\u6b3e\u8d26\u53f7:987654321(\u5de5\u5546\u94f6\u884c).
```

In step 220, the service application combines the decrypted displayed information, the decrypted Xml information and the decrypted expended information to obtain data to be signed.

Optionally, in the present embodiment, the service application performs TLV combining on the displayed information, the Xml information and the expended information.

step 221, the service application authenticates a PIN code input by the user, determines whether the verifying is successful, step 222 is executed if the verifying is successful; otherwise, information that authentication of the PIN code is failed is taken as a returning value, and step 227 is executed.

In step 221, the method that the service application authenticates the PIN code input by the user includes that the service application determines whether the PIN code input by the user is identical to the PIN code prestored in the smart key device, if yes, go to step 222 is executed if PIN code input by the user is identical to the PIN code prestored in the smart key device; otherwise, information that authentication of the PIN code is failed is taken as a returning value, and step 227 is executed.

For example, the PIN code in the present application is 12345678.

In step 222, the service application reads a public key and a CN (Cert Name) field from a certificate in the smart key device;

In the present application, the service application reads the certificate in the smart key device to obtain the certificate public key of the certificate and the CN field.

In step 223, the service application verifies the CN field and determines whether the verifying to the CN field is successful, step 224 is executed if the verification to the CN field is successful; otherwise, information that the verification to the certificate user name is failed is taken as a returning value, and step 227 is executed.

The method that the service application verifies the CN field includes that the service application determines whether the decrypted CN field is identical to the CN field obtained from the smart key device, step 224 is executed if the decrypted CN field is identical to the CN field obtained from the smart key device; otherwise, information that the verification to the certificate user name is failed is taken as a returning value, and step 227 is executed.

In step 224, the service application sends the data to be signed, a length of the data to be signed, a certificate, a certificate length, a type of a signature and a sequence number of the smart key device to the smart key device.

In the present embodiment, the type of the signature is preset in the service application.

After the smart key device receives the data sent by the service application, the data to be signed is verified according to the length of the data to be signed. After data to be signed is successfully verified, the data to be signed is encrypted with a user private key which is obtained according to the certificate and the certificate length. Then the encrypted data to be signed is signed by using an algorithm corresponding to the type of the signature to obtain a signing result and return the signing result to the service application; the smart key device sends information that the signing is an error back to the service application if the verification is failed or there is no algorithm corresponding to the type of the signature.

In step 225, the service application receives information returned by the smart key device and determines whether the information returned by the smart key device is a signature result, step 226 is executed if the information returned by the smart key device is the signature result; otherwise, step 227 is executed.

In step 226, the service application invokes the openURL function by taking the URL character string of the application stored in APPURLName_str, a second verifying reference, information of response message and a returning value as parameters, and clears the modal dialogue box, step 228 is executed.

In the present embodiment, the second verifying reference is preset in the service application and is used to authenticate the service application in the application.

In the present embodiment, the returning value of step 226 is 0.

In the present embodiment, the response message information includes a signing result and a returning value. Specifically, the signing result may be Sign_PKCS7Info in the response message information; the returning value may be ResponseCode in the response message information.

In addition, in the present embodiment, the response message information further includes MessageType, Version, SessionID, Random, U_APPVversion, U_SerialNumber, U_PublicKeyC and Reserve, where, MessageType, Version, SessionID and Random are sent to the service application by the application via the openURL function, the service application writes them into corresponding position when parameters are analyzed. U_APPVersion is preset in the service application. The obtained sequence number of the smart key device is U_SerialNumber, the read certificate public key of the smart key device is U_PublicKeyC.

For example, in the present embodiment, the URL character string of the application stored in APPURLName_str is cn.com.xxxx.phone.

In step 227, the service application invokes the openURL function by taking a URL character string of the application in APPURLName_str, the second verifying reference and a returning value as parameters, eliminates the modal dialogue box and step 228 is executed.

In step 227, the service application takes corresponding error code as a returning value. For example, the returning value is 402 if the service application Base64 does not successfully decode; the returning value is 423 if the service application Base64 does not successfully decrypt; the returning value is 404 if the key pressed by the user is a Cancel key; the returning value is 420 if the smart key device does not successfully sign.

In step 228, in the case that the application is invoked by openURL function, the second verifying reference is authenticated and whether the second verifying reference is successfully authenticated is determined, step 229 is executed if the second verifying reference is successfully authenticated; otherwise, the application is ended.

The application determines whether the second verifying reference is identical to the verifying reference preset in the application, step 229 is executed if the second verifying reference is identical to the verifying reference preset in the application; otherwise, the application is ended.

step 229, the application analyzes a reference of the openURL function and determines whether a returning value obtained by analyzing is 0, step 230 is executed if the returning value obtained by analyzing is 0; otherwise, step 231 is executed.

For example, in the present embodiment, the returning value of 0 indicates a successful signing; the returning value of a non-zero value indicates a failed signing.

In step 230, the application indicates a signing result and the application is ended.

In step 231, the application shows corresponding error message according to the returning value and the application is ended.

In the present embodiment, the order of the step that the service application verifies the PIN code and the step that the service application verifies the CN field may be exchanged.

Alternatively, the steps of verifying the PIN code and verifying the CN field may be performed between step 216 and step 217. The present embodiment provides a method for completing digital signing in a mobile operating system; when the application is modified or updated, the service application is not required to be changed; otherwise, when the service application is modified or updated, the application is not required to be changed; on the contrary, when the service application is modified or updated, the application is not required to be changed, which implements independent arrangement of the application and service application and avoids attacks of virus effectively.

Embodiment 3

Figure 5:
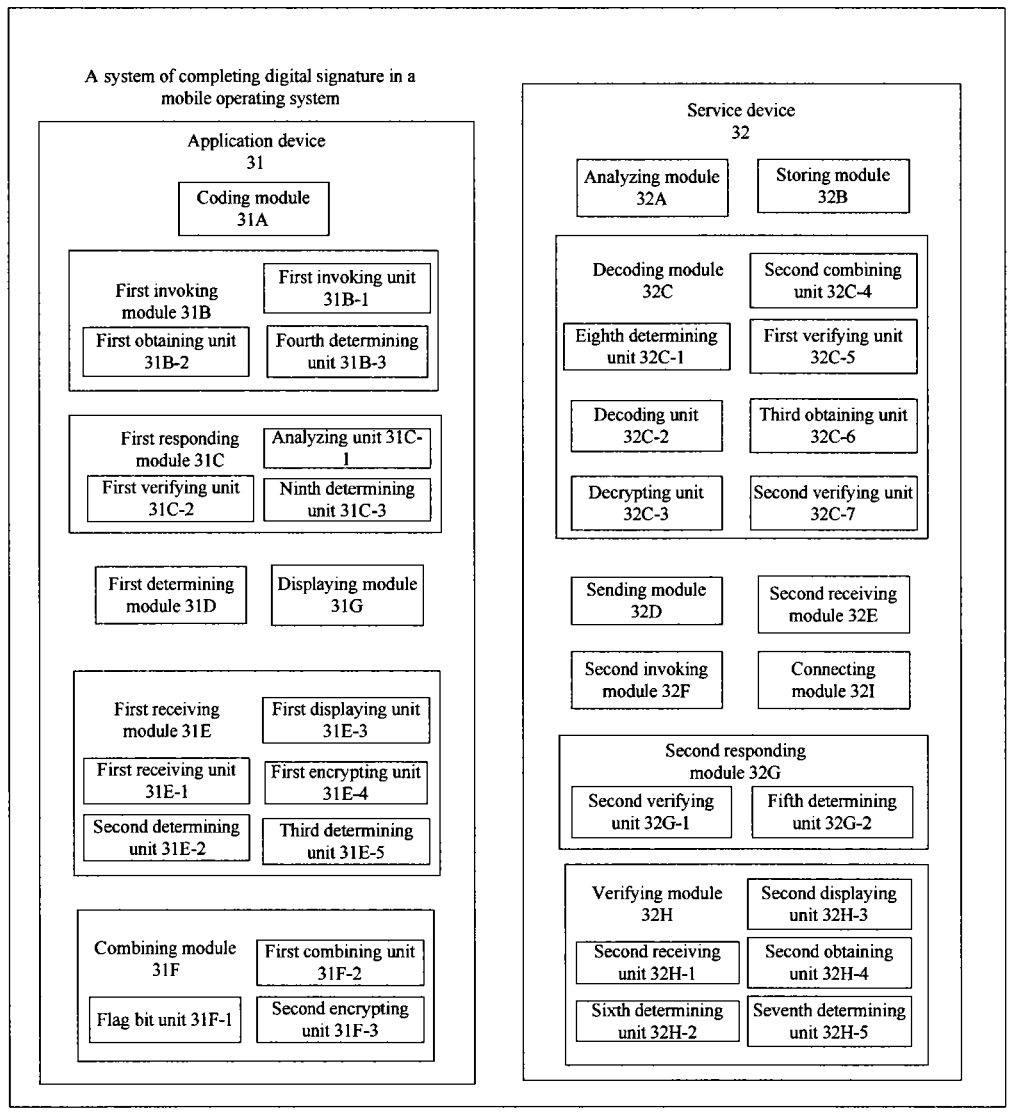
FIG. 5 shows a block diagram for a system of implementing digital signature in a mobile operating system provided in Embodiment 3 of the present disclosure.

Embodiment 3 of the present disclosure provides a system for implementing digital signature in a mobile operating system. Shown by FIG. 5, the system includes an application device 31 and a service device 32.

The application device 31 includes an encoding module 31A, a first invoking module 31B and a first responding module 31C.

The encoding module 31A is configured to encode data to be signed to obtain a first data package.

The first invoking module 31B is configured to invoke a system preset function by taking an address character string of a service application, an address character string of the application and the first data package as parameters.

The first responding module 31C is configured to analyze parameters of the system preset function in the case that the application is invoked by the system preset function.

The service device includes an analyzing module 32A, a storing module 32B, a decoding module 32C, a sending module 32D, a second receiving module 32E and a second invoking module 32F.

The analyzing module 32A is configured to analyze the parameters of the system preset function in the case that the service application is invoked by the system preset function.

The storing module 32B is configured to store address character string of the application.

The decoding module 32C is configured to decode the first data package in the analyzed the parameters of the system preset function.

The sending module 32D is configured to send the data to be signed and a preset signature type to a smart key device.

The second receiving module 32E is configured to receive information returned by the smart key device.

The second invoking module 32F is configured to invoke the system preset function by taking the information returned by the smart key device, a stored address character string of the application and a returning value as parameters; or invoke the system preset function by taking the stored address character string of the application and a returning value as parameters.

The second receiving module 32E of the service application 32 includes a receiving unit and a first determining unit.

The receiving unit is configured to receive the information returned by the smart key device.

The first determining unit is configured to determine whether the information returned by the smart key device is a signing result.

The application device 31 further includes a first determining module 31D.

The first determining module 31D is configured to determine whether a returning value is the returning value indicating correct information.

The application device 31 further includes a first receiving module 31E and a combining module 31F.

The first receiving module 31E includes a first receiving unit 31E-1, a second determining unit 31E-2, a first displaying unit 31E-3, a first encrypting unit 31E-4 and a third determining unit 31E-5.

The first receiving unit 31E-1 is configured to receive information input by a user and information of a first keystroke of a user;

The second determining unit 31E-2 is configured to determine whether the information input by the user and the information of the first keystroke of a user is received.

The first displaying unit 31E-3 is configured to output prompt information via a display.

The first encrypting unit 31E-4 is configured to encrypt a certificate user name input by the user.

The third determining unit 31E-5 is configured to determine a type of a key stroked by a user according to the information of the first keystroke of a user.

The combining module 31F includes a flag bit unit 31F-1, a first combining unit 31F-2 and a second encrypting unit 31F-3.

The flag bit unit 31F-1 is configured to set or reset a flag bit.

The first combining unit 31F-2 is configured to combining first information, second information and third information to obtain the data to be signed.

The second encrypting unit 31F-3 is configured to encrypt the data to be signed, or encrypt the first information, the second information and the third information respectively.

The first invoking module 31B is further configured to invoke the system preset function by taking the address character string of the service application, the character string of the application, a first verifying reference and the first data package as parameters.

The first invoking module 31B includes a first invoking unit 31B-1, a first obtaining unit 31B-2 and a fourth determining unit 31B-3.

The first invoking unit 31B-1 is configured to invoke the system preset function by taking the address character string of the service application, the character string of the application and the first data package as parameters.

The first obtaining unit 31B-2 is configured to obtain a returning value of the system preset function.

The fourth determining unit 31B-3 is configured to determine a type of the returning value of the system preset function.

The service device 32 includes a second responding module 32G, which is configured to make response to the system preset function.

The second responding module 32G includes a second authenticating unit 32G-1 and a fifth determining unit 32G-2.

The second authenticating unit 32G-1 is configured to authenticate a first verifying reference obtained by analyzing.

The fifth determining unit 32G-2 is configured to determine whether the first verifying reference is successfully authenticated.

The service device 32 includes a verifying module 32H, which is configured to verify a sequence number of the smart key device.

The verifying module 32H includes a second receiving unit 32H-1, a sixth determining unit 32H-2, a second displaying unit 32H-3, a second obtaining unit 32H-4 and a seventh determining unit 32H-5.

The second receiving unit 32H-1 is configured to receive information of a second keystroke of a user.

The sixth determining unit 32H-2 is configured to determine a type of a key stroked by a user according to the information of the second keystroke of a user.

The second displaying unit 32H-3 is configured to output a modal dialogue box via the display.

The second obtaining unit 32H-4 is configured to obtain the sequence number of the smart key device.

The seventh determining unit 32H-5 is configured to determine whether the obtained sequence number of the smart key device is identical to the sequence number of the smart key device sent by the application.

The decoding module 32C includes an eighth determining unit 32C-1, a decoding unit 32c-2, a decrypting unit 32C-3, a second combining unit 32C-4, a first verifying unit 32C-5, a third obtaining unit 32C-6 and a second verifying unit 32C-7.

The eighth determining unit 32C-1 is configured to determine whether the flag bit is set.

The decoding unit 32C-2 is configured to decode the first data package.

The decrypting unit 32C-3 is configured to decrypt a decoding result.

The second combining unit 32C-4 is configured to combine the first information, the second information and the third information which are obtained in the case that the decrypting unit performs a successfully decrypting, and to obtain the data to be signed.

The first verifying unit 32C-5 is configured to verify a PIN code input by the user.

The third obtaining unit 32C-6 is configured to obtain a certificate public key and a certificate user name from the certificate of the smart key device.

The second verifying unit 32C-7 is configured to verify the certificate user name input by the user;

The second receiving unit 32H-1 is further configured to receive the PIN code input by the user.

The application device 32 further includes a connecting module 32I which is configured to communicate with the smart key device.

The second invoking module 32F is further configured to invoke the system preset function by taking a second verifying reference, a stored address character string of the application, information returned by the smart key device and a returning value as parameters, and eliminate the modal dialogue box.

The first responding module 31C includes an analyzing unit 31C-1, a first authenticating unit 31C-2 and a ninth determining unit 32C-3.

The analyzing unit 32C-1 is configured to analyze the parameters of the system preset function when the application is invoked by the system preset function.

The first authenticating unit 31C-2 is configured to authenticate the second verifying reference.

The ninth determining unit 31C-3 is configured to determine whether the second verifying reference is successfully authenticated.

The application device 31 further includes a displaying module 31G which is configured to display the signing result or display corresponding error information according to a returning value.

The above description is only the preferable implementation of the disclosure, and the protection scope thereof is not restricted herein. The variation or replacement within the technical scope made by those skilled in the art may fall into the protection scope of the disclosure. Therefore, the protection scope of the disclosure may be subject to the protection scope of the claims.

The invention claimed is:

1. A method for implementing digital signature in a mobile operating system, comprising:
   in the case that an application is invoked, performing following steps:
   step S1 comprising coding, by the application, data to be signed to obtain a first data package;
   step S2 comprising invoking, by the application, a system preset function by taking an address character string of a service application, an address character string of the application and the first data package as parameters;
   step S3 comprising analyzing, by the service application, parameters of the system preset function in the case that the service application is invoked by the system preset function, and storing the address character string of the application;
   step S4 comprising decoding, by the service application, the first data package in the parameters of the system preset function obtained by analyzing, obtaining the data to be signed if the first data package is successfully decoded, and step S5 being executed; otherwise, invoking, by the service application, the system preset function by taking the stored address character string of the application and a returning value as parameter, and going to step S8, where the returning value is information that the decoding is failed;
   step S5 comprising sending, by the service application, the data to be signed and a preset signing type to a smart key device;
   step S6 comprising receiving, by the service application, information returned by the smart key device;
   step S7 comprising invoking, by the service application, the system preset function by taking the information returned by the smart key device, the stored address character string of the application and a returning value as parameters; and
   step S8 comprising analyzing, by the application, parameters of the system preset function to obtain a signing result or the returning value, and ending in the case that the application is invoked by the system preset function.

2. The method of claim 1, wherein
   step S6 comprises step S6' comprising receiving, by the service application, the information returned by the smart key device and determining whether the information returned by the smart key device is the signing result, going to step S7' if the information returned by the smart key device is the signing result; otherwise, invoking, by the service application, the system preset function by taking the stored address character string of the application and a returning value as parameters, wherein the returning value is information that the signing is an error;
   step S7 comprises step S7' comprising invoking, by the service application, the system preset function by taking the signing result, the stored address character string of the application and the returning value as parameters; and
   step S8 comprises step S8' comprising analyzing, in the case that the application is invoked by the system preset function, by the application, the parameters of the system preset function and determining whether a returning value obtained by analyzing indicates correct information, obtaining the signing result if the returning value indicates the correct information and ending; otherwise, obtaining error information and ending.

3. The method of claim 1, wherein step S1 comprises:
   step S1-1 comprising: waiting, by the application, for receiving information input by a user and information of a first keystroke of a user, determining whether the information input by the user and the information of the first keystroke of the user are received; going to step S1-3 if the information input by the user and the information of the first keystroke of the user are received; otherwise going to step S1-2; wherein the information input by the user comprises a first account, a second account, transmitting information, a certificate username and a sequence number of the smart key device;
   step S1-2 comprising outputting, by the application, prompt information via a display, going back to step S1-1;
   step S1-3 comprising encrypting, by the application, the certificate username in the information input by the user;
   step S1-4 comprising determining, by the application, a type of a user keystroke according to the information of the first keystroke of the user, going to step S1-5 if the type of the user keystroke is an original signature; otherwise going to step S1-7;
   step S1-5 comprising setting, by the application, a flag bit, combining first information, second information and third information to obtain the data to be signed and encrypting the data to be signed; wherein the first information is one part of the information input by the user, the second information is obtained by combining the other part of the information input by the user and preset information in the application and the third information is the preset information in the application;

step S1-6 comprising encoding, by the application, an encrypting result of data to be signed, generating the first data packet according to the encoding result and going to step S2;

step S1-7 comprising resetting, by the application, the flag bit and encrypting the first information, the second information and the third information respectively;

step S1-8 comprising encoding, by the application, an encrypting result of the first information, the second information and the third information respectively, generating the first data package according to the encoding result and going to step S2.

4. The method of claim 3, wherein generating the first data package comprises: generating the first data package according to the encoding result and the flag bit; wherein the encoding result comprises the sequence number of the smart key device and an encrypted certificate username.

5. The method of claim 1, wherein step S2 comprises:
step S2' comprising invoking, by the application, the system preset function by taking the address character string of the service application, the address character string of the application, a preset first verifying reference and the first data package as parameters.

6. The method of claim 1, wherein after step S2, the method further comprises:
step S2-1 comprising obtaining, by the application, a returning value of the system preset function and determining a type of the returning value, starting the service application if the returning value is YES; otherwise ending.

7. The method of claim 5, wherein step S3 comprises:
step S3-0 comprising in the case that the service application is invoked by the system preset function, analyzing parameters of the system preset function, authenticating an obtained first verifying reference and determining whether the authenticating is successful, storing the address character string of the application obtained by analyzing if the authenticating is successful;
otherwise ending.

8. The method of claim 3, wherein step S3 further comprises:
step S3-1 comprising in the case that the service application receives information of a second keystroke of a user input by the user, determining a type of a user keystroke according to the information of the second keystroke of the user, going to step S3-2 if the type of the user keystroke is an OK key; otherwise, information of user cancelation being taken as a returning value, invoking, by the service application, the system preset function by taking the address character string of the application and the returning value as parameters and going to step S8;
step S3-2 comprising outputting, by the service application, a modal dialogue box via the display;
step S3-3 comprising analyzing, by the service application, the parameters of the system preset function and storing the address character string of the application;
step S3-4 comprising obtaining, by the service application, the sequence number of the smart key device, determining whether the obtained sequence number of the smart key device is identical to the sequence number of the smart key device obtained by analyzing, going to step S4 if the obtained sequence number of the smart key device is identical to the sequence number of the smart key device obtained by analyzing; otherwise, information that verifying the sequence number of the smart key device is failed is taken as a returning value; invoking, by the service application, the system preset function by taking the stored address character string of the application and the returning value as parameters and going to step S8.

9. The method of claim 8, wherein step S4 comprises:
step S4-1 comprising determining, by the service application, whether the flag bit is set, going to step S4-2 if the flag bit is set; otherwise, going to step S4-3;
step S4-2 comprising decoding, by the service application, the first data package, decrypting a decoding result, obtaining the certificate username input by the user and the data to be signed and going to step S4-4 if the decrypting is successful; otherwise, information that decrypting the decoding result is failed is taken as a returning value; invoking, by the service application, the system preset function by taking the stored address character string of the application and the returning value as parameters and going to step S8;
step S4-3 comprising decoding, by the service application, the first data package and decrypting a decoding result; obtaining the certificate username input by the user, the first information, the second information and the third information and combining the first information, the second information and the third information to obtain the data to be signed if decrypting the decoding result is successful, and going to step S4-4; otherwise, information that decrypting the decoding result is failed is taken as a returning value; invoking, by the service application, the system preset function by taking the stored address character string of the application and the returning value as parameters and going to step S8;
step S4-4 comprising verifying, by the service application, a PIN code input by the user, going to step S4-5 if the verifying is successful; otherwise, information that verifying PIN code is failed is taken as a returning value; invoking, by the service application, the system preset function by taking the stored address character string of the application and the returning value as parameters and going to step S8;
step S4-5 comprising obtaining, by the service application, a certificate public key and a certificate username from the certificate of the smart key device;
step S4-6 comprising verifying, by the service application, the obtained certificate username according to the certificate username input by the user, going to step S5 if the verifying is successful; otherwise, information that verifying certificate username is failed is taken as a returning value, invoking, by the service application, the system preset function by taking the stored address character string of the application and the returning value as parameters and going to step S8.

10. The method of claim 9, wherein, before step S4-4, the method further comprises receiving, by the service application, the PIN code input by the user.

11. The method of claim 10, wherein
step S4-4 comprises step S4-4' comprising obtaining, by the service application, certificate public key and certificate username from the certificate in the smart key device;
step S4-5 comprises step S4-5' comprising verifying, by the service application, the certificate username input by the user by using the obtained certificate username, going to step S4-6' if the verifying is successful; otherwise, information that verifying the certificate username is failed is taken as a returning value, invoking, by the service application, the system preset function by taking the address character string and the returning value as parameters and going to step S8;
step S4-6 comprises step S4-6' comprising verifying, by the service application, the PIN code input by the user, going to step S5 if the verifying is successful; otherwise, information that verifying PIN code is failed is taken as a returning value, invoking, by the service application, the system preset function by taking the stored address character string of the application and the returning value as parameters and going to step S8.

12. The method of claim 1, wherein before step S5, the method further comprises connecting, by the service application, to the smart key device.

13. The method of claim 11, wherein step S7 comprises:
step S7-1 comprising invoking, by the service application, the system preset function by taking a preset second verifying reference, the stored address character string of the application, the information returned by the smart key device and the returning value as parameters; and
clearing the modal dialogue box and ending.

14. The method of claim 2, wherein step S6' comprises step S6'-1 comprising receiving, by the service application, the information returned by the smart key device, determining whether the information returned by the smart key device is the signing result, going step S7' if the information returned by the smart key device is the signing result; otherwise, information of a error signature is taken as a returning value, invoking, by the service application, the system preset function by taking a preset second authenticating parameter, the stored address character string of the application and the returning value as parameters;
step S7' comprises step S7'-1 comprising invoking, by the service application, the system preset function by taking the preset second verifying reference, the stored address character string of the application, the information returned by the smart key device and the returning value as parameters.

15. The method of claim 13, wherein step S8 comprises:
step S8-0 comprising in the case that the application is invoked by the system preset function, analyzing the references of the system preset function, authenticating a second verifying reference obtained by analyzing, determining whether the authenticating is successful, obtaining the signing result or a returning value if the authenticating is successful and ending; otherwise, ending.

16. The method of claim 14, wherein step S8' comprises:
step S8'-0 comprising in the case that the application is invoked by the system preset function, analyzing the parameters of the system preset function, authenticating whether a second verifying reference obtained by analyzing is successful, determining whether a returning value obtained by analyzing is a returning value indicating correct information if the authenticating is successful; obtaining the signing result if the returning value obtained by analyzing is the returning value indicating the correct information, and ending; otherwise, obtaining error information, and ending; in the case that the authenticating is failed, ending.

17. The method of claim 16, wherein step S8' further comprises: displaying the signing result or displaying corresponding information according to the returning value.

18. A system for implementing digital signature in a mobile operating system, comprising: an application device and a service device; wherein the application device comprises a encoding module, a first invoking module and a first responding module;
the encoding module is configured to encode data to be signed to obtain a first data package;
the first invoking module is configured to invoke a system preset function by taking an address character string of service application, an address character string of application and the first data package as parameters;
the first responding module is configured to analyze parameters of the system preset function in the case that the application is invoked by the system preset function;
the service device comprises: an analyzing module, a storing module, a decoding module, a sending module, a second receiving module and a second invoking module;
the analyzing module is configured to analyze the parameters of the system preset function in the case that the service application is invoked by the system preset function;
the storing module is configured to store the address character string of the application;
the decoding module is configured to decode the first data package in the parameter of the system preset function obtained by analyzing;
the sending module is configured to send the data to be signed obtained by successful decoding of the decoding module and a preset signing type to a smart key device;
the second receiving module is configured to receive information returned by the smart key device;
the second invoking module is configured to invoke the system preset function by taking the information returned by the smart key device, a stored address character string of the application and a returning value as parameters, or invoke the system preset function by taking the stored address character string of the application and the returning value as parameters.

19. The system of claim 18, wherein the second receiving module in the service application comprises a receiving unit and a first determining unit;
the receiving unit is configured to receive the information returned by the smart key device;
the first determining unit configured to determine whether the information returned by the smart key device is a signing result;
the application device further comprises a first determining module;
the first determining module is configured to determine whether the returning value is a returning value indicating correct information.

20. The system of claim 18, wherein the application device further comprises a first receiving module and a combining module;
the first receiving module comprises a first receiving unit, a second determining unit, a first displaying unit, a first encrypting unit and a third determining unit;
the first receiving unit is configured to receive information input by the user and information of a first keystroke of a user;
the second determining unit is configured to determine whether the information input by the user and the information of the first keystroke of the user are received;
the first displaying unit is configured to output prompt information via a display;
the first encrypting unit is configured to encrypt a certificate username in the information input by the user;

the third determining unit is configured to determine a type of a user keystroke according to the information of the first keystroke of the user;

the combining module comprises a flag bit unit, a first combining unit and a second encrypting unit;

the flag bit unit is configured to set a flag bit or reset the flag bit;

the first combining unit is configured to combine first information, second information and third information to obtain the data to be signed;

the second encrypting unit is configured to encrypt the data to be signed, or encrypt the first information, the second information and the third information respectively.

21. The system of claim 18, wherein the first invoking module is further configured to invoke the system preset function by taking the address character string of the service application, the address character string of the application, a preset first verifying reference and the first data package as parameters.

22. The system of claim 18, wherein the first invoking module comprises a first invoking unit, a first obtaining unit and a fourth determining unit;

the first invoking unit is configured to invoke the system preset function by taking the address character string of the service application, the address character string of the application and the first data package as parameters;

the first obtaining unit is configured to obtain a returning value of the system preset function;

the fourth determining unit is configured to determine a type of the returning value of the system preset function.

23. The system of claim 21, wherein the service application comprises a second responding module configured to respond to the system preset function;

the second responding module comprises a second authenticating unit and a fifth determining unit;

the second authenticating unit is configured to authenticate a first verifying reference obtained by analyzing;

the fifth determining unit is configured to determine whether the first verifying reference is successfully authenticated.

24. The system of claim 20, wherein the service application further comprises a verifying module configured to verify a sequence number of the smart key device obtained by the analyzing module;

the verifying module comprises a second receiving unit, a sixth determining unit, a second displaying unit, a second obtaining unit and a seventh determining unit;

the second receiving unit is configured to receive information of a second keystroke of a user;

the sixth determining unit is configured to determine a type of a user keystroke according to the information of the second keystroke of the user;

the second displaying unit is configured to output a modal dialogue box via the display;

the second obtaining unit is configured to obtain the sequence number of the smart key device; and the seventh determining unit is configured to determine whether an sequence number of the smart key device obtained by the seventh determining unit is identical to a sequence number of the smart key device obtained by analyzing.

25. The system of claim 24, wherein the decoding module comprises an eighth determining unit, a decoding unit, a decrypting unit, a second combining unit, a first verifying unit, a third obtaining unit and a second verifying unit;

the eight determining unit is configured to determine whether the flag bit obtained by analyzing is set;

the decoding unit is configured to decode the first data package obtained by analyzing;

the decrypting unit is configured to decrypt a result of successful decoding performed by the decoding unit;

the second combining unit is configured to combine the first information, the second information and the third information to obtain data to be signed when the decrypting unit performs a successful decryption;

the first verifying unit is configured to verify a PIN code input by the user;

the third obtaining unit is configured to obtain a certificate public key and a certificate username from the certificate of the smart key device;

the second verifying unit is configured to verify the certificate username input by the user according to the certificate username obtained by the third obtaining unit.

26. The system of claim 25, wherein the second receiving unit is further configured to receive the PIN code input by the user.

27. The system of claim 26, wherein the application device further comprises a connecting module configured to connect to the smart key device.

28. The system of claim 27, wherein the second invoking module further configured to invoke the system preset function by take a preset second verifying reference, the stored address character string of the application, the information returned by the smart key device and the returning value as parameters and clear the modal dialogue box.

29. The system of claim 28, wherein the first responding module comprises an analyzing unit, a first authenticating unit and a ninth determining unit;

the analyzing unit is configured to analyze the references of the system preset function in the case that the application is invoked by the system preset function;

the first authenticating unit is configured to authenticate the second verifying reference obtained by analyzing; and the ninth determining unit is configured to determine whether the second verifying reference is successfully authenticated.

30. The system of claim 28, wherein the application device further comprises a displaying module configured to display the signing result or error information according to the returning value.

* * * * *